United States Patent
Salstrom

(12) 
(10) Patent No.: US 6,620,998 B2
(45) Date of Patent: Sep. 16, 2003

(54) RECYCLING HEAT FROM INDUSTRIAL PROCESSES TO GENERATE ELECTRICITY USING A THERMOPHOTOVOLTAIC GENERATOR

(75) Inventor: Neil F. Salstrom, Camas, WA (US)

(73) Assignee: SEH America, Inc., Vancouver, WA (US)

( * ) Notice: Subject to any disclaimer, the term of this patent is extended or adjusted under 35 U.S.C. 154(b) by 18 days.

(21) Appl. No.: 09/983,798

(22) Filed: Oct. 25, 2001

(65) Prior Publication Data

US 2003/0079773 A1 May 1, 2003

(51) Int. Cl.[7] .................. H01L 31/058; C30B 35/00
(52) U.S. Cl. .................. 136/253; 117/200; 117/222; 117/931; 60/641.8
(58) Field of Search .................. 136/253; 117/200, 117/222, 931; 60/641.8

(56) References Cited

U.S. PATENT DOCUMENTS

| | | | |
|---|---|---|---|
| 5,512,109 A | 4/1996 | Fraas et al. | |
| 5,551,992 A | 9/1996 | Fraas | |
| 5,616,186 A | 4/1997 | Fraas et al. | |
| 5,651,838 A | 7/1997 | Fraas et al. | |
| 5,865,906 A | 2/1999 | Ferguson et al. | |
| 5,942,047 A | 8/1999 | Fraas et al. | |
| 6,037,536 A | 3/2000 | Fraas | |
| 6,057,507 A | 5/2000 | Fraas et al. | |
| 6,091,018 A | 7/2000 | Fraas et al. | |
| 6,177,628 B1 | 1/2001 | Fraas et al. | |
| 6,218,607 B1 | 4/2001 | Mulligan et al. | |
| 6,232,545 B1 | 5/2001 | Samaras et al. | |
| 6,271,461 B1 | 8/2001 | Fraas et al. | |
| 6,423,896 B1 * | 7/2002 | Keegan | 136/253 |
| 6,486,392 B1 * | 11/2002 | Samaras et al. | 136/253 |
| 2002/0084121 A1 * | 7/2002 | Hulen | 180/65.3 |

OTHER PUBLICATIONS

Erickson et al, "Design and construction of a thermophotovoltaic generator using turbine combustion gas," Energy Conversion Engineering Conference, IECE, Proceedings of the 32nd Intersociety, Jul. 27–Aug. 1, 1997, pp. 1101–1106.*

Yamaguchi et al, "Thermophotovoltaic Potential Applications for Civilian and Industrial Use in Japan," Thermophotovoltaic Generation of Electricity, Fourth NREL conference, 1999, pp. 17–29.*

* cited by examiner

*Primary Examiner*—Alan Diamond
(74) *Attorney, Agent, or Firm*—Oliff & Berridge, PLC

(57) ABSTRACT

The invention teaches a method and apparatus for the generation of electric power by recycling the heat generated by various industrial processes. Thermophotovoltaic cells are used to convert the heat radiated from the industrial apparatus used to perform the various processes into electricity. Arrays of thermophotovoltaic cells placed around the apparatus, which may optionally be surrounded by an infrared (IR) emitter. The emitter serves to convert the IR radiation of the initial heat source into IR radiation having a more uniform wavelength. The cell arrays are spaced outward from a convection barrier tube and a short pass filter that may be placed around the IR emitter. A heat sink may be placed outside of the perimeter formed by the array of thermophotovoltaic cells, this serves to cool the thermophotovoltaic arrays, and also increases the power density of the cells, which in turn improves the power generation capacity of the array.

20 Claims, 3 Drawing Sheets

RECYCLING HEAT FROM INDUSTRIAL PROCESSES TO GENERATE ELECTRICITY USING A THERMOPHOTOVOLTAIC GENERATOR

BACKGROUND OF THE INVENTION

1. Field of Invention

The invention relates to thermophotovoltaic power generators for converting excess heat from industrial processes to electricity. In embodiments, the present invention relates to the use of such generators in various aspects of a silicon crystal growing process or plant, for harnessing excess heat and converting the heat into useable energy.

2. Description of Related Art

Photovoltaic cells, more commonly known as solar cells, made of silicon or GaAs have been used to generate electricity from visible light energy. Solar cells have been used to power handheld games and calculators as well as to generate electricity in homes and businesses where solar panels have been incorporated into the roof or other suitable structures. However, solar cells typically generate only 0.01 watts/cm$^2$ in direct sunlight. Thus, in addition to the quality of the light (e.g., direct sunlight or sunlight on an overcast day) the electrical output of these cells has been limited by the surface area exposed to available light sources.

Between 75 to 90% of the available energy is in the infrared (IR) spectrum, not the spectrum of visible light. Unfortunately, the spectrum of IR radiation is beyond the band gap of silicon and GaAs cells, although it is within the band gap of GaSb cells. These GaSb, or thermophotovoltaic ("TPV") cells, respond to infrared radiation rather than visible light energy from light sources, such as the sun. Thermophotovoltaic generators for converting fuel energy into electrical energy have been described. See U.S. Pat. Nos. 5,512,109, 5,616,186, 5,651,838 and 5,942,047 to Fraas et al.; U.S. Pat. Nos. 5,551,992 and 6,037,536 to Fraas; U.S. Pat. No. 5,865,906 to Ferguson et al.; and U.S. Pat. No. 6,218,607 to Mulligan et al. The generators described are powered by hydrocarbon fuels such as natural gas, propane, butane, or kerosene. These generators primarily generate lower power outputs suitable for purposes such as residential or space heating.

GaSb TPV cells have been shown to be capable of generating electricity reliably and economically. The integration of TPV generators into portable or residential heaters reduces energy costs and provides a measure of independence from outside power generation systems that have been prone to interruption or failure.

SUMMARY OF THE INVENTION

Many industrial processes generate intense amounts of heat that, more often than not, is simply dissipated into the environment. The tremendous heat output of these processes can instead be harnessed to generate electricity. The heat generated by processes performed in a wide variety of apparatus such as, for example, electric, natural gas, oil and other furnaces for melting ore, growing crystals, making glass, annealing materials, containers for any exothermic chemical processes, or various heat exchanger systems can thus be advantageouly be harnessed to produce energy that can be used elsewhere in a plant or that can be fed back into the apparatus.

In the past, a common practice has been to utilize appropriately placed heat exchangers around various process units, to harness some of the excess heat energy for use elsewhere in the production process. Thus, for example, heat exchangers have been widely used around exothermic reaction vessels to use the generated heat energy to produce steam or heated water, which can be used in other process units. This has resulted in cost savings and efficiency gains, since other energy sources are not required to heat the process water. The present inventors have discovered that the excess heat produced by these various processes can thus alternatively or additionally be harnessed by thermophotovoltaic cells, to provide a source of recovered energy that likewise can be returned to the individual process unit, or recirculated into the power grid for use elsewhere. Generally, the above described processes must be performed either under strict temperature controls or on a scale such that thermal inertia permits greater uniformity of temperature from a given heat source. The present inventors have discovered that heat output of these processes can also yield higher power outputs from TPV generators.

When GaSb TPV cells are exposed to an IR source, the cells absorb IR radiation having a wavelength of 1.7 $\mu$m and convert the heat energy to electrical energy. Optimal efficiency with the TPV cells is achieved when the temperature of the IR radiation source tube is nearly constant. Thus, industrial processes would be able provide IR radiation at amounts and wavelengths that are more stable than in smaller portable or residential sources.

BRIEF DESCRIPTION OF THE DRAWINGS

Certain preferred embodiments of this invention will be described in detail, with reference to the following figures, in which.

DETAILED DESCRIPTION OF PREFERRED EMBODIMENTS

Figure 1:
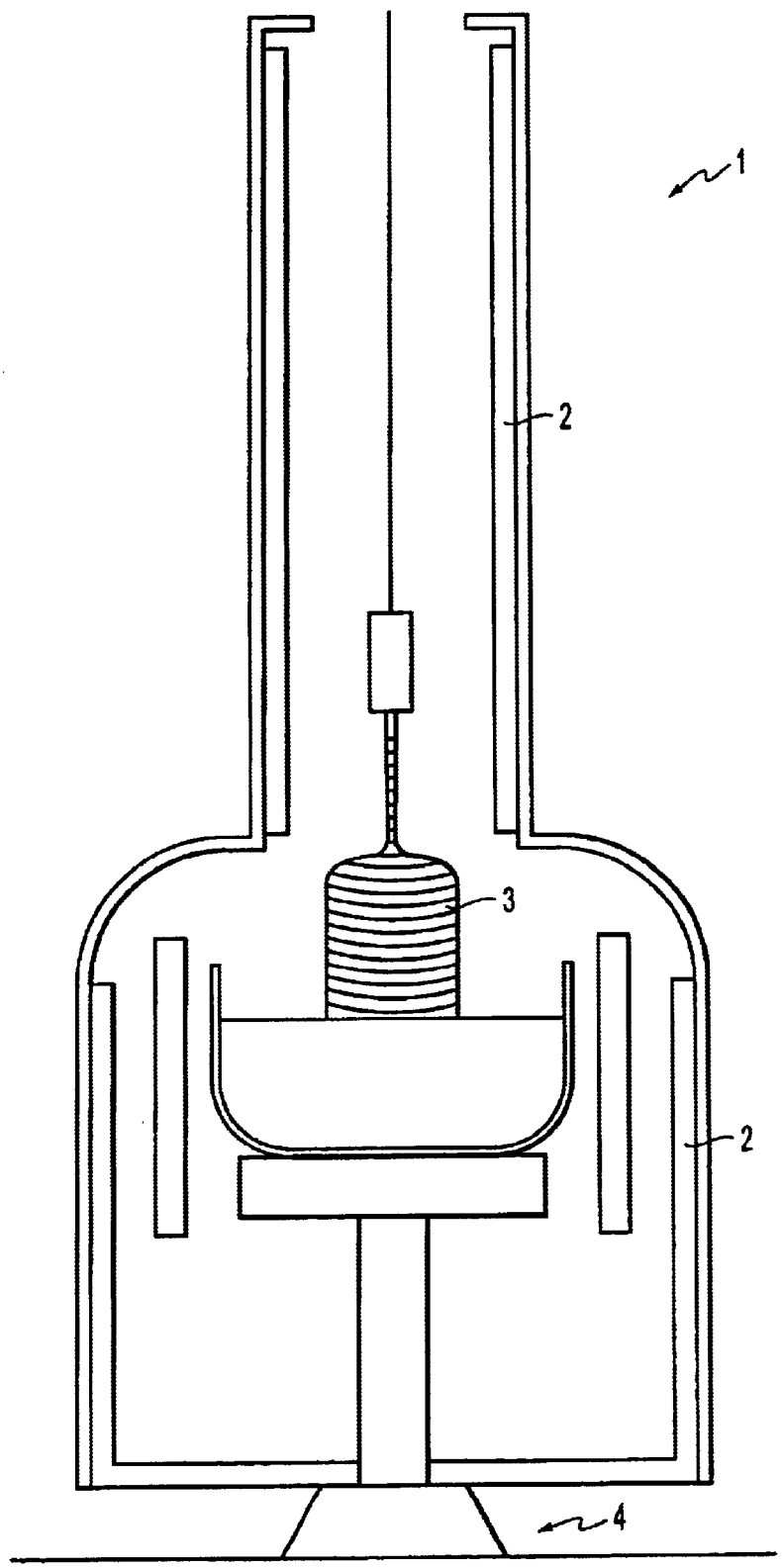
FIG. 1 is a view of the overall setup of a generator of the present invention in cross-sectional side elevation.

This invention provides for the generation of electricity from the excess heat generated by many industrial processes. These processes are generally performed in various apparatus or systems such as electric furnaces for melting ore, growing crystals, annealing materials, containers for any exothermic chemical processes, such as the Haber process, or cooling water heat exchanger systems. More often than not, the heat generated by these processes is simply dissipated into the environment. However, with the development of GaSb TPV cells, the tremendous heat output of these processes can instead be harnessed to generate electricity. Given the vast quantities of heat generated by industrial processes one can expect higher power outputs from TPV generators.

In an industrial setting, many suitable heat sources can be found, including various electric, natural gas or oil powered furnaces used, for example, to melt or purify ore and anneal metals, as well as numerous exothermic chemical processes, such as the Haber process, and various heat exchanger systems. These processes are generally performed either under strict temperature controls or on a scale such that thermal inertia permits greater uniformity of temperature from a given heat source.

A prime example of a heat intensive process is the Czochralski (CZ) method, which is used to produce a substantial majority of the monocrystalline silicon used to make silicon chips for the solid-state electronics industry. In brief, the CZ method involves melting chunks of high-purity polycrystalline silicon in a quartz crucible located in a specifically designed furnace to form a silicon melt. The crucible is typically heated using a radio-frequency inductive heating element. A tremendous amount of heat is required to melt the silicon, as the melting point of silicon is 1414° C. Thus, the temperature of the apparatus must be maintained well above 1000° C. (see Mayer, J. W. and Lau, S. S., *Electronic Material Science: For integrated circuits in Si and GaAs*, Macmillan Publishing Co., New York, N.Y., 1990 pp. 15–17). The crystal is grown by inserting a seed crystal into the melt, and then slowly withdrawing the seed crystal to pull a single crystal from the melt. Uniformity of temperature in this process is critical to prevent the formation of fractures in the monocrystal, as the growth of the crystal occurs by freezing at the interface between the solid seed and the melt. Thus, the CZ method is a process that calls for strict uniformity of the temperature of the process.

Accordingly, in embodiments of the present invention, any suitable and conventional process equipment can be modified to include one or more thermophotovoltaic cells to harness excess generated heat, and transform that excess generated heat into electrical energy. Such modifications can be made, for example, to process units such as distillation columns, scrubbers, other separation units, heaters, dryers, incinerators, heat exchangers, reaction vessels, and the like. Preferably, the thermophotovoltaic cells are incorporated into such process units in a quantity or size such that the operation of the process unit is not adversely affected, but such that effective amounts of energy are generated by the cells. Based on the present disclosure, one of ordinary skill in the art will be able to modify conventional process units to recover excess generated heat.

Thus, for example, in the exemplary embodiment where the thermophotovoltaic cells are utilized in a crystal growing process, the thermophotovoltaic cells can be used in one or more process units related to the crystal growing process. For example, one or more thermophotovoltaic cells can be appropriately placed within the crystal growing apparatus, where significant heat generation occurs. However, the thermophotovoltaic cells can be used in other units associated with the process, including in or around power generators, heat generators, heat exchangers, or the like, where generated heat energy would otherwise be lost into the environment.

According to the present invention, any suitable TPV cell can be used for converting heat into electrical energy. For example, suitable TVP cells include the GaSb TPV cells produced by JX Crystals, Inc., Issaquah, Wash., USA. However, any suitable TPV crystal can be used according to the present invention.

According to embodiments of the present invention, the TPV cells can be used either alone or in combinations of two or more. Thus, for example, the TPV cells can be used individually, or they can be organized into an array of multiple TPV cells. Likewise, different sized TPV cells and/or arrays can be used in embodiments, as desired.

Optimal efficiency with the TPV cells is achieved when the temperature of the IR radiation source tube is nearly constant. GaSb TPV cells are sensitive to IR radiation having a wavelength of about 1.7 $\mu$m and when exposed to IR radiation of the appropriate wavelength convert heat energy to electrical energy. Thus, given the scale of many industrial processes, the output of IR radiation from these sources would be in amounts and wavelengths that are more stable than in smaller portable or residential sources.

Alternatively, an infrared emitter may also be used to induce the emission of IR radiation of a uniform wavelength. Such emitters have been described in U.S. Pat. No. 5,616,186 to Fraas et al. These emitters increase the amount of TPV cell convertible infrared by heating materials such as platinum and platinum/rhodium alloys, which in turn emit IR radiation at a wavelength of 1.55 $\mu$m, which can be converted to electricity by GaSb TPV cells. Furthermore, emitters of platinum or platinum/rhodium are also very durable, as they do not melt at temperatures around 1500° C. and do not oxidize at such temperatures. Use of these emitters can increase the amount of convertible IR radiation that is produced through the various industrial processes.

In addition, increasing the diameter of the emitter permits a higher number of TPV cells to be placed around the heat source, and thereby increases the generator power rating. With the larger size of many industrial apparatus, far more TPV cells could be placed around such apparatus than around the heaters described in U.S. Pat. No. 5,512,109 to Fraas et al. Fraas et al. describes the calculations for the dimensions for a 1 kW generator, assuming an upper temperature limit of 1500° C. At that temperature, a typical IR sensitive cell is capable of producing 4 watts per cm$^2$. Given a cell active area of 0.75 cm$^2$, each cell will produce 3 watts. Assuming 20 cells per receiver and 20 receivers arrayed around the burner, the resultant generator will produce 1200 watts. Assuming an emitter circumference equal to 20 times a cell width implied an emitter diameter of (20×0.85 cm×1")/(2.54 cm×3.14)=2.13 INCHES. The pillar diameter will then be approximately 1" and the IR emitting zone length will be approximately 8". A generator of the present invention would be able to produce at least 100 kW to 1000 kW, or preferably 250 kW to 750 kW, and more preferably about 500 kW, very efficiently. Thus, the integration of the TPV generators of the invention with industrial apparatus, such as a crystal growth furnace, will yield considerable savings on power expenditures.

According to the present invention, the TPV cells are preferably used around or in conjunction with processing equipment that produce either high temperatures, or high levels of infrared radiation. Thus, for example, the TPV cells can be advantageously used around or in conjunction with a CZ crystal growing apparatus, since the apparatus is heated to temperatures at or around 1414° C. to melt the silicon material. However, TPV cells can be used in other lower heat- or IR-generating equipment, as desired, where less electricity would be produced. In addition, the electrical generation even in these embodiments can be further increased by the use of the above-described emitters.

The TPV generators of the invention generally comprise an infrared emitting source, for example, the crystal growth hotzone of a crystal growth furnace. The infrared emitting source may optionally be surrounded by an infrared emitter, so that the heat from the source is converted to a wavelength that is matched to the bandgap of the TPV cells. A receiver with TPV cells is positioned around the emitter, and a heat sink may be placed near the receiver. The TPV cells may also be incorporated in the cooling systems already present in devices such as a CZ crystal growth furnace, where, for example, cool argon gas is flowed through during crystal growth. The heat sink absorbs any excess heat away from the emitter and receiver and increases the cooling efficiency of the cells. In addition to the heat from the IR source, the process of converting IR radiation to electric power also produces a substantial amount of heat (see, Fraas et al., U.S. Pat. No. 5,651,838, col. 1, lines 17–19). By increasing the cooling efficiency of the TPV cells, the cell power density can be increased in the receiver, which in turn improves the power generation capacity of the receiver.

In embodiments, if desired, an IR transparent window can be interposed between the heat source and the TPV cells. Such a window can shield the TPV cell from the direct heat energy of the heat source, while still allowing the desired IR energy to reach the TPV cells. An IR transparent window allows the IR radiation from either the heat source or the emitter to pass through. The IR transparent window may be needed, for example, for apparatus such as crystal growth furnaces, annealing furnaces, epitaxial reactors or chemical vapor deposition reactors. These processes are generally temperature sensitive and are usually shielded with insulating or refractory materials that restrict the loss of heat, as such, an IR transparent window may be desired to allow the IR radiation to reach the thermovoltaic cells.

In addition, a short pass IR filter may optionally be incorporated into the generator surrounding the apparatus. The short pass filter may preferably be placed before the thermophotovoltaic cell to filter out IR radiation of longer wavelength, which is converted to electrical energy less efficiently by the TPV cells.

Figure 2:
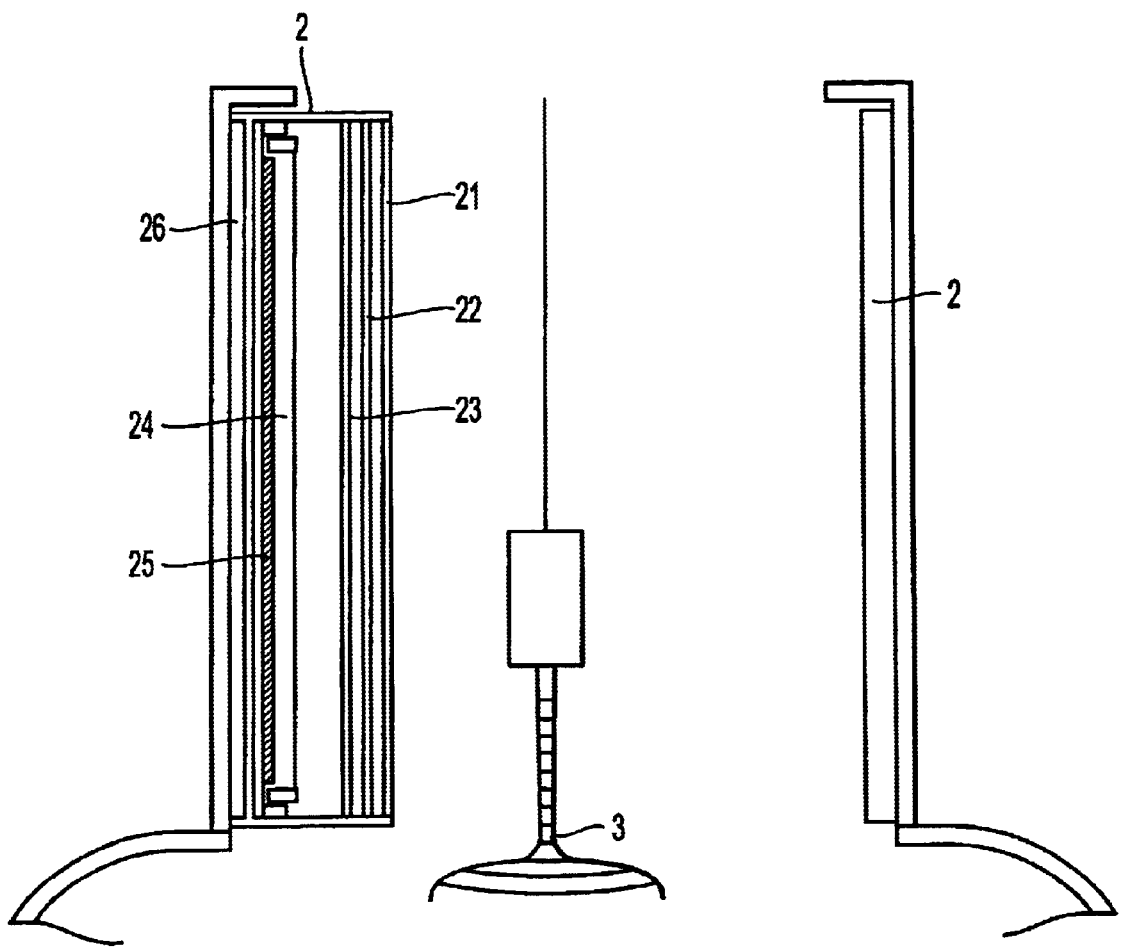
FIG. 2 is an expanded view of one of the generating arrays within an exemplary device according to the present invention.
Figure 3:
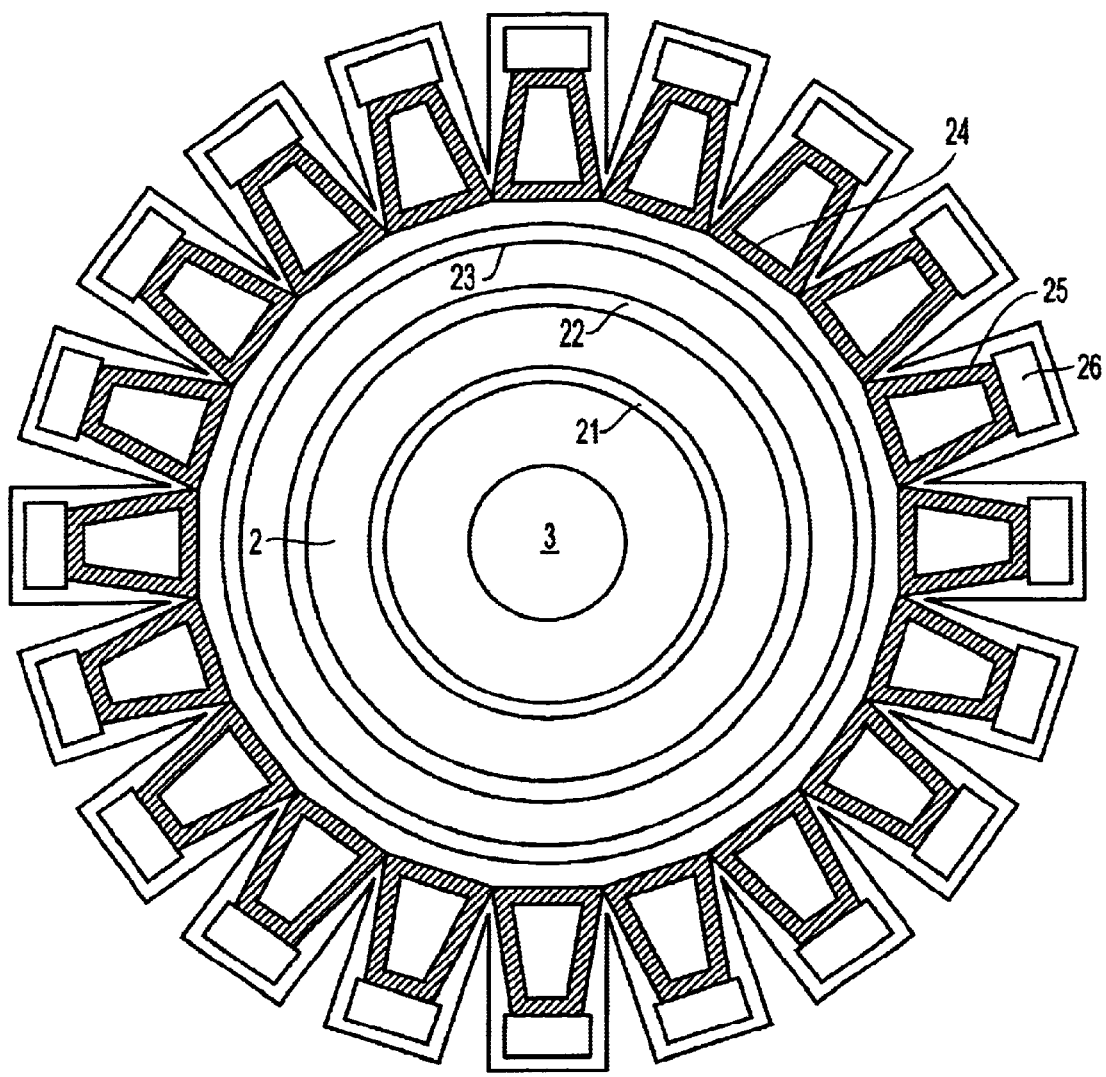
FIG. 3 is a top plan view of the generator shown in FIG. 1.

In the present invention, as shown in exemplary embodiments in FIGS. 1, 2 and 3. In FIG. 1, a crystal growing vessel 1 for growing single crystals using the Czochralski method is shown. The growing vessel is supported on a central pillar 4. The infrared (IR) energy emitter array 2 is located inside the crystal growing vessel 1, and is exposed to heat given off by the growing silicon crystal 3.

FIG. 2 shows an expanded view of the arrangement of the TPV array in the crystal growing vessel. The heat given off by the silicon crystal 3 during the crystal growth process heats the IR emitter 21. An IR transparent window tube 22 surrounds the path of growth for the silicon crystal 3, and allows IR radiation generated by the emitter 21 to pass through. Electric power is generated when IR radiation from the emitter 21 passes through the window tube 22, the transparent convection barrier tube 23, the optional short-pass IR filter 24, and is absorbed by the TPV cells 25. Excess heat from the cells is removed by fluid flow in the cooling channel 26. The cooling channel may be integrated with the cooling jacket that is conventionally part of the crystal growth furnace.

FIG. 1, thus generally corresponds to a conventional CZ crystal growing apparatus, modified in accordance with the present invention to incorporate TPV cells. Crystal growth furnaces, such as the CZ crystal growing apparatus, are well understood in the art.

FIG. 3 shows the concentric arrangement of these parts.

Similar arrays can be built around other heat generating industrial apparatus as well. In particular, applications such as refining or annealing processes, heat exchangers, as well as any other heat generating process or apparatus can be modified according to the present invention.

While this invention has been described in conjunction with the specific embodiments described above, it is evident that many alternatives, modifications and variations are apparent to those skilled in the art. In particular, it should be noted that there is no limitation on how TPV cells may be arranged. The TPV cells may be placed in any suitable position or arrangement about a heat source, so long as the TPV array is not subjected to excessive heat that could damage the array. Accordingly, the preferred embodiments of this invention as set forth above are intended to be illustrative and not limiting. Various changes can be made without departing from the spirit and scope of this invention as defined in the following claims.

What is claimed is:

1. A method for recovering energy from a silicon crystal growth process, comprising:
   providing an industrial apparatus that is used in the silicon crystal growth process that emits heat and infrared radiation, and at least one thermophotovoltaic cell positioned with respect to the industrial apparatus for absorbing the emitted heat and infrared radiation; and
   converting at least a portion of said emitted heat and infrared radiation into electrical power using said at least one thermophotovoltaic cell.

2. The method of claim 1, wherein the industrial apparatus that is used in the silicon crystal growth process is selected from the group consisting of a crystal growth furnace, an annealing furnace, and a heat exchange system.

3. The method of claim 1, wherein the amount of power produced is between about 100 kW and 1000 kW.

4. The method of claim 1, wherein the amount of power produced is between about 250 kW and 750 kW.

5. The method of claim 1, wherein the amount of power produced is about 500 kW.

6. The method of claim 1, wherein the method further comprises heating an IR emitter with the heat generated by the industrial apparatus related to the silicon crystal growth process to generate IR radiation of a substantially uniform wavelength before the emitted heat and infrared radiation is absorbed by the at least one thermophotovoltaic cell.

7. The method of claim 1, wherein the method further comprises passing the emitted heat and infrared radiation through a short pass filter before the emitted heat and infrared radiation is absorbed by the at least one thermophotovoltaic cell.

8. The method of claim 1, wherein the method further comprises cooling the at least one thermophotovoltaic cell by placing a heat sink near the at least one thermophotovoltaic cell.

9. The method of claim 1, wherein said electrical power is returned directly to said industrial apparatus that is used in the silicon crystal growth process.

10. The method of claim 1, wherein said electrical power is not returned directly to said industrial apparatus.

11. A thermophotovoltaic generator, comprising:
    an industrial apparatus that is used in a crystal growth process that emits heat and infrared radiation; and
    at least one thermophotovoltaic cell positioned with respect to the industrial apparatus for absorbing the emitted heat and infrared radiation,
    wherein the at least one thermophotovoltaic cell converts at least a portion of said emitted heat and infrared radiation into electrical power.

12. The generator of claim 11, wherein the industrial apparatus that is used in the crystal growth process is selected from the group consisting of a crystal growth furnace, an annealing furnace, epitaxial reactors, chemical vapor deposition reactors, and a cooling water heat exchange system.

13. The generator of claim 11, wherein the industrial apparatus is surrounded by an IR emitter, which is heated by the industrial apparatus, placed between the industrial apparatus and the at least one thermophotovoltaic cell.

14. The generator of claim 11, wherein the industrial apparatus is surrounded by an IR transparent window tube placed between the industrial apparatus and the at least one thermophotovoltaic cell.

15. The generator of claim 11, wherein the industrial apparatus is surrounded by a short pass IR filter placed between the industrial apparatus and the at least one thermophotovoltaic cell.

16. The generator of claim 11, wherein a heat sink is placed around the at least one thermophotovoltaic cell.

17. A crystal growing apparatus comprising:
   a crucible for holding a silicon material;
   a heater for heating said crucible to melt said silicon material; and
   at least one thermophotovoltaic cell positioned with respect to the crucible for absorbing heat and infrared radiation emitted by said crucible,
   wherein said at least one thermophotovoltaic cell converts at least a portion of said emitted heat and infrared radiation into electrical power.

18. The apparatus of claim 17, wherein the crystal growing apparatus is surrounded by an IR transparent window tube placed between the apparatus and the at least one thermophotovoltaic cell.

19. The apparatus of claim 17, wherein the crystal growing apparatus is surrounded by a short pass IR filter placed between the apparatus and the at least one thermophotovoltaic cell.

20. The apparatus of claim 17, wherein a heat sink is placed around the at least one thermophotovoltaic cell.

* * * * *